UNITED STATES PATENT OFFICE.

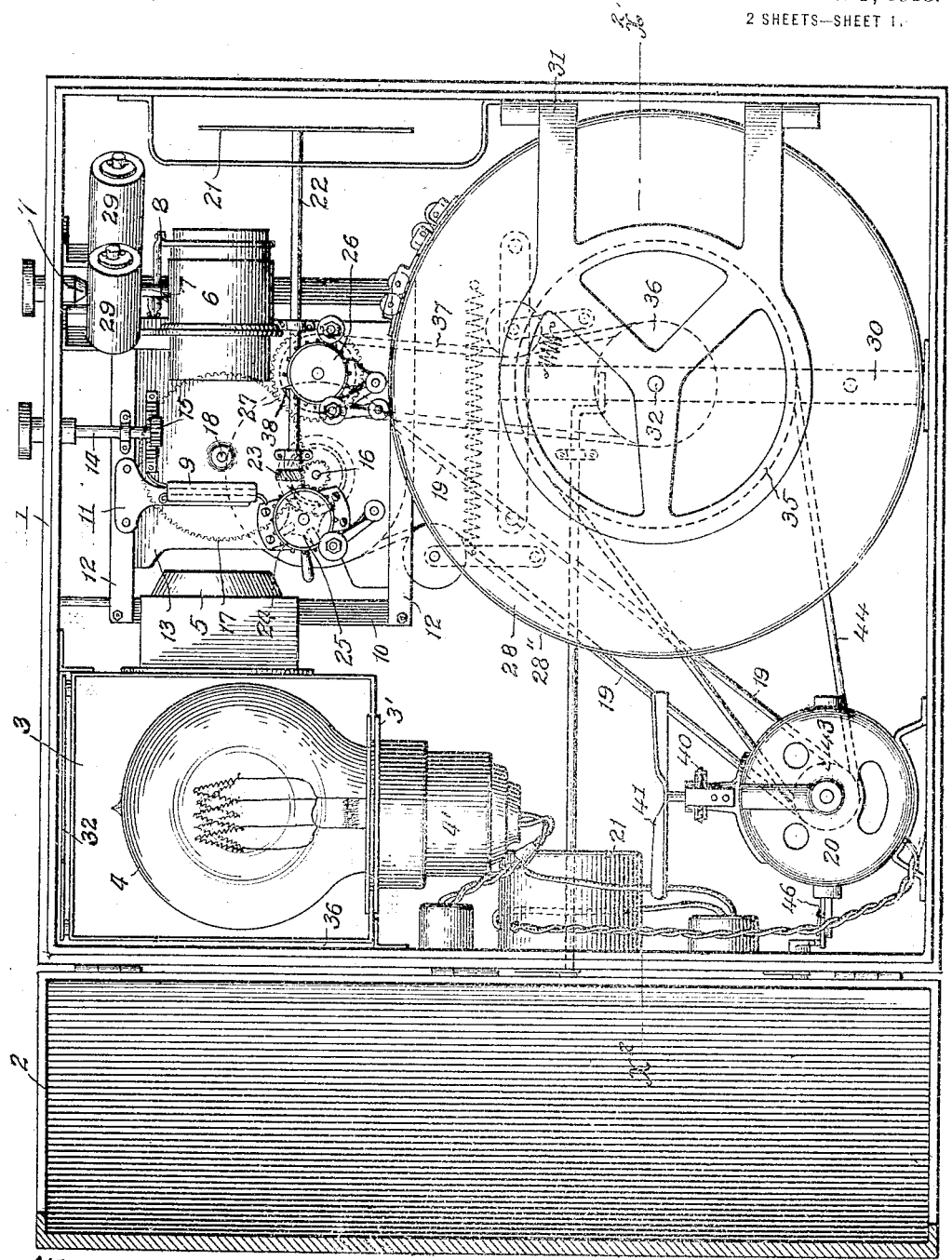

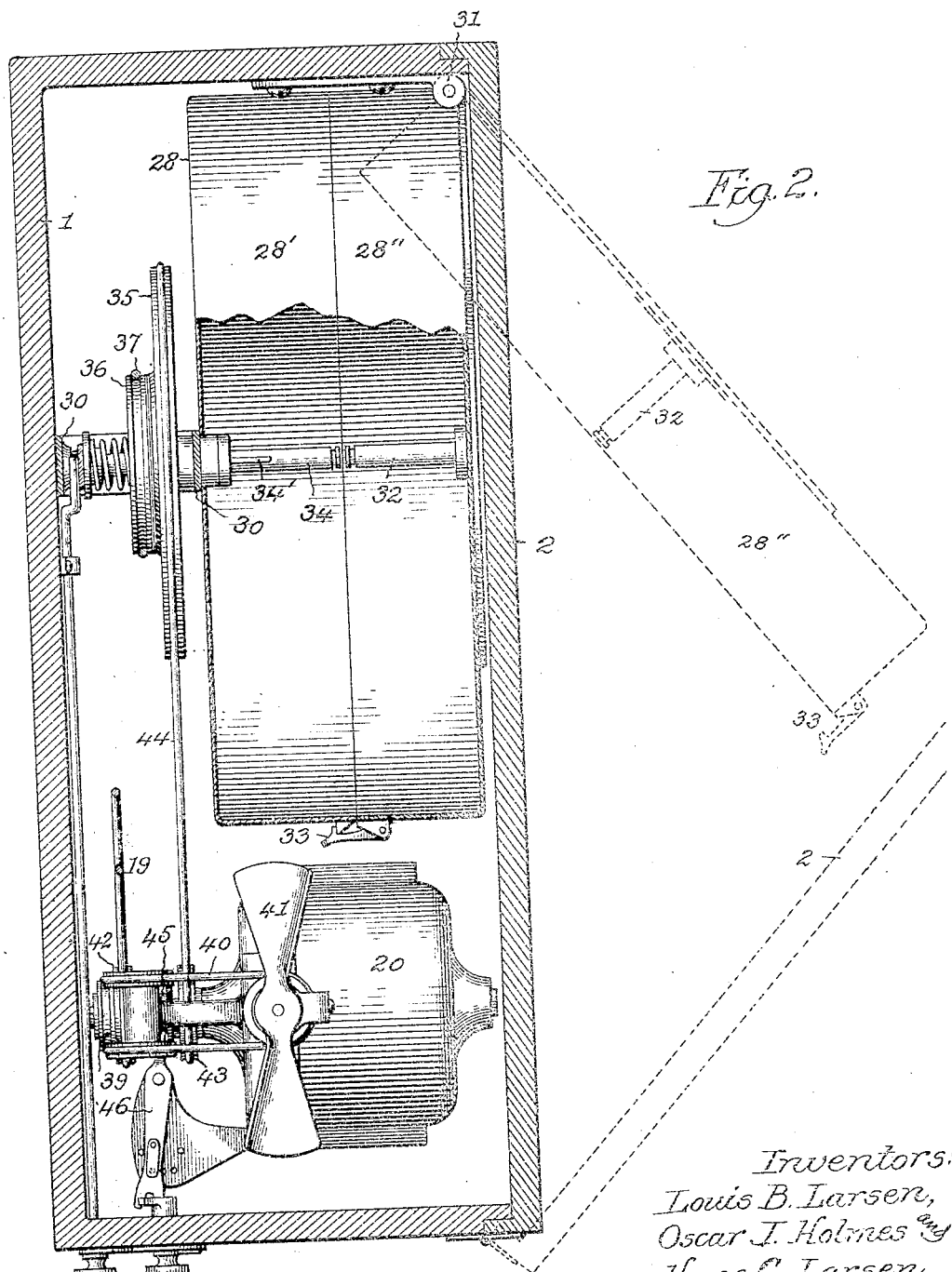

LOUIS B. LARSEN, OSCAR J. HOLMES, AND HANS G. LARSEN, OF CHICAGO, ILLINOIS, ASSIGNORS TO ACME MOTION PICTURE PROJECTOR COMPANY, A CORPORATION OF ILLINOIS.

MOTION-PICTURE MACHINE.

1,286,662.

Specification of Letters Patent.

Patented Dec. 3, 1918.

Application filed November 8, 1917. Serial No. 200,878.

*To all whom it may concern:*

Be it known that we, LOUIS B. LARSEN, OSCAR J. HOLMES, and HANS G. LARSEN, citizens of the United States of America, and residents of Chicago, in the county of Cook, State of Illinois, have invented certain new and useful Improvements in Motion-Picture Machines, of which the following is a specification.

This invention relates to that class of portable motion picture machines in which the film feeding mechanism, film reels and illuminating means are arranged in a closed and readily portable casing, and has for its objects:

To provide a simple and efficient structural formation and association of parts of the containing casing or magazine for the delivery and take-up reels of a motion picture machine of a compact and convenient form adapted to afford a ready removal, replacement and interchange of the film reels in the different operations of the machine, all as will hereinafter more fully appear.

In the accompanying drawings:

Figure 1, is a side elevation of a motion picture machine embodying the present improvement, a hinged side wall or door of the inclosing casing being shown open and in section.

Fig. 2, is a horizontal section on line $x^2$—$x^2$, Fig. 1. Like reference numerals indicate like parts in both views.

Referring to the drawings, 1 designates the main or inclosing casing of the machine, preferably of the rectangular box form shown, and having a hinged side wall or door 2 for convenient access to the contained mechanisms and parts of the machine.

3 designates the lamp house or inclosure, arranged in the upper and rear portion of the casing 1 and adapted to house the incandescent electric lamp 4 by which the illumination of the machine is provided. In the construction shown the bottom wall of the lamp housing 1 is formed by a laterally removable plate 3′ which in turn carries a depending socket 4′ adapted to receive the lamp 4 aforesaid.

5 designates the optical condenser, and 6 designates the objective of the apparatus, of any usual and suitable type and alined with each other and with the filament of the lamp 4, as usual in the present class of machines.

7 designates an operating shaft extending out through the top wall of the casing 1, and provided at its outer end with an operating handle or knob for convenient manual rotation. At its inner end the shaft 7 has crank and pitman connection 8 with the movable member of the objective 6 for effecting a focusing adjustment of said objective.

9 designates the fixed apertured film guide or plate by which the picture film is guided transversely through the optical center of the machine in proper spaced relation to the rear portion of the objective 6 aforesaid. Said film guide 9 and the associated feeding mechanism may be of any ordinary and suitable construction, but are preferably of the construction shown in the drawings, and which forms the subject matter of a prior application for Letters Patent, Serial No. 196,129, filed October 12, 1917, and consisting as follows:—

10 designates a track frame secured to a side wall of the casing 1, and to which the aforesaid film guide or plate 9 is fixedly attached by a lateral carrying bracket 11 as shown. The track frame 10 also carries lateral brackets or posts to the ends of which are secured upper and lower longitudinally disposed tracks or slideways 12 for the guidance of the hereinafter described carriage of the film feeding mechanism, in a longitudinal plane parallel with the optical center of the machine.

13 designates the carriage above referred to, preferably of the plate form shown, and having sliding engagement with the aforesaid tracks or slideways 12.

14 designates an operating shaft journaled on the track frame 10 and carrying a pinion 15 having operative engagement with a rack bar on the carriage 13 aforesaid, and adapted to effect a longitudinal adjustment of said carriage. The end of the shaft 14 opposite to that carrying the pinion 15 extends out through the top wall of the casing 1 and is provided with a handle or knob for convenient manual actuation.

16 designates the driving shaft by which the intermittent film feeding mechanism and the light shutter of the machine are operated in unison. The shaft 16 is journaled in the carriage 13, and in addition to the usual gearing connection 17 with an operating shaft capable of manual rotation, has power connection by pulley and endless belt 19 with an electric motor 20 arranged in the lower and rear portion of the casing 1. In the structure shown, the electric motor 20 in addition to affording driving power for the film feeding mechanism as above set forth, also furnishes power for operating the film take-up and film rewinding mechanisms hereinafter referred to and the details of which constitute the subject matter of a separate application for Letters Patent, Serial No. 200,877, filed Nov. 8, 1917.

21 designates the light shutter before referred to, preferably of the radial bladed type and carried by a shaft 22 journaled longitudinally on the carriage 13 aforesaid, so as to be adjusted longitudinally therewith, and is provided at its rear end with gearing connection 23 with the driving shaft 16 above described.

24 designates the intermittent film feeding sprocket drum journaled in the carriage 13 aforesaid, in operative relation to the lower end of the film guide 9, and carrying the driven element of an intermittent gearing device such as the ordinary Geneva movement 25 shown in Fig. 1, the driving element of said intermittent gearing being fixed to the operating shaft 16 aforesaid.

26 designates the sprocket drum by which the usual free loop in the picture film is maintained at the upper and entrance end of the film guide or plate 9. The carrying shaft of said drum 26 is also journaled in the carriage 13 and receives constant rotation from the shaft 18 through gearing 27. In the preferred construction shown, the sprocket drum 26 is arranged in a plane to one side of the plane in which the intermittent film feeding sprocket drum 24 is arranged and in line with the film delivery reel of the machine, while the aforesaid film feeding sprocket drum 24 is in line with the film take-up reel of the machine in the normal operation of the same as a picture projecting apparatus.

The take-up and delivery reels above referred to are arranged in a magazine or casing 28 located in the forward and lower portion of the inclosing casing 1 of the machine, and are preferably of the construction and arrangement described in detail in separate applications for Letters Patent, Serial No. 196,129 filed Oct. 12, 1917, and Serial No. 200,877 filed Nov. 8, 1917.

29 designates a pair of idler drums journaled in the upper and forward end of the main casing 1 in horizontal spaced relation to each other, and disposed in oblique relation to the optical center of the machine as shown in Fig. 1. As so arranged the drums 29 are adapted to maintain an oblique loop in the picture film, after the same has been unthreaded from the intermittent film feeding mechanism and apertured film guide heretofore described, and placed over said drums 29 in the operation of changing the mechanisms from an exhibiting condition to a rewinding condition.

The reel holding magazine 28 above referred to, is located in a lower and forward portion of the inclosing casing 1, and a material part of the present improvement involves a special construction of said magazine, and of the means associated therewith for supporting and operating the pair of film reels usually employed in the present type of machines, and consisting as follows:—

The reel magazine 28 consists of two approximately counterpart cup shaped portions 28′, 28″ the circular margins of which are adapted to abut against each other to provide a single chamber within the magazine of a width sufficient to receive a pair of film reels side by side.

The magazine portion 28′ is fixed within the main casing 1, preferably by a supporting frame or standard 30, while the companion magazine portion 28″ is capable of a horizontal swinging movement in relation to the other portion 28′ on a hinge connection 31 as shown more particularly in Fig. 2. Each magazine portion is provided with an individual peripheral orifice for the passage of the picture film to and from a film reel arranged in a particular magazine portion aforesaid.

32 designates a centrally arranged reel carrying shaft fixedly secured to the end wall of the magazine portion 28″ and provided at its free end with a peripheral groove adapted for engagement with a swinging latch piece on the film reel, to hold said reel against lateral displacement in actual use while leaving said reel free to revolve upon the spindle 32.

33 designates a latch adapted to hold the magazine portions 28′ 28″ in a closed position.

34 designates a reel carrying shaft journaled in the supporting frame 30 aforesaid, and extending centrally into the interior of the fixed magazine portion 28′ and adapted to support a film reel therein, said reel being held in rotative engagement with said shaft by a spline or key 34′ engaging in a corresponding slot or keyway in the central bore of the reel hub. And said reel is also held from lateral disengagement by a swinging latch piece on the film reel engaging in a peripheral groove in the shaft 34 aforesaid.

35 designates a grooved pulley fixed on the reel shaft 34 aforesaid, and having an endless belt and pulley connection with the power shaft of the electric motor 20, hereinafter described in detail. In the present structure the pulley 35 receives positive rotation from said motor or power shaft in the operation of rewinding the picture film after said film has been passed through and projected by the exhibiting means of the machine. At other times the pulley 35 is out of operative engagement with said motor shaft.

36 designates a grooved pulley mounted loose on the reel shaft 34 aforesaid, and having endless belt connection 37 with a grooved pulley 38 secured to the carrying shaft of the loop forming sprocket drum 26 heretofore described. One side of the pulley 36 is formed in any usual manner for frictional engagement with the adjacent side of the fixed pulley 35 aforesaid, and is adapted to be moved into and resiliently held in frictional engagement with said pulley 35, by manually actuated means set forth in detail in the aforesaid application for Letters Patent Serial No. 200,877, filed Nov. 8, 1917.

The above described frictional driving engagement between the pulleys 36 and 35 is effective during the operation of the machine in projecting a series of pictures, and is adapted to cause a take-up of the film as the same comes from the intermittent film feeding mechanism during such picture projecting operation.

39 designates a grooved pulley fixedly secured to the power shaft of the electric motor 20, and having endless belt connection 40 with a similar grooved pulley on the carrying shaft of a fan 41 by which ventilation and cooling of the lamp house and other parts of the machine is effected, as set forth in a separate application for patent Serial No. 200,879 filed Nov. 8, 1917.

42 designates a grooved pulley mounted loose on the power shaft of the aforesaid motor 20, and forming part of the pulley and endless belt connection 19 of the intermittent film feeding mechanism heretofore described.

43 designates a grooved pulley also mounted loose on the aforesaid shaft of the motor 20 in spaced relation to the pulley 42 aforesaid, and having endless belt connection 44 with the grooved pulley 35 of the reel carrying shaft 34 heretofore described.

45 designates a sliding clutch member having movement on and with the aforesaid shaft of the motor 20, and adapted to assume three positions to wit: first in clutch engagement with the pulley 42 to drive the film feeding mechanism of the machine; second, in clutch engagement with the pulley 43 to drive the film rewind mechanism of the machine, and third, in an intermediate position out of clutch engagement with both of the pulleys 42, 43. Such last mentioned position prevails when the machine is operated by hand through the mechanism heretofore described. The said clutch member 45 receives movement from a manually operated lever 46, preferably of the detail construction set forth in the aforesaid application for Letters Patent, Serial No. 200,877.

Having thus fully described our said invention what we claim as new and desire to secure by Letters Patent is:

1. In a film reeling mechanism for motion picture machines, the combination of a reel magazine having a transverse width adapted to receive the film supply and take-up reels of the machine and comprising a fixed section and a movable section, a shaft or spindle mounted centrally in said movable magazine section to provide an individual journal bearing for the film supply reel, and a driven shaft or spindle associated centrally with said fixed magazine section and adapted to support and have rotative engagement with the film take-up reel, substantially as set forth.

2. In a film reeling mechanism for motion picture machines, the combination of a reel magazine having a transverse width adapted to receive the film supply and take-up reels of the machine and comprising a fixed section and a movable section in hinged association with said fixed magazine section, a shaft or spindle mounted centrally in said movable magazine section to provide an individual journal bearing for the film supply reel, and a driven shaft or spindle associated centrally with said fixed magazine section and adapted to support and have rotative engagement with the film take-up reel, substantially as set forth.

3. In a film reeling mechanism for motion picture machines the combination of a supporting frame, a reel magazine having a transverse width adapted to receive the film supply and take-up reels of the machine and comprising a section fixed to the supporting frame and a movable section associated with said fixed section, a shaft or spindle mounted centrally in said movable section to provide an individual journal bearing for the film supply reel, and a driven shaft or spindle journaled in the supporting frame in central association with said fixed magazine section and adapted to support and have rotative engagement with the film take-up reel, substantially as set forth.

4. In a film reeling mechanism for motion picture machines, the combination of a supporting frame, a reel magazine having a transverse width adapted to receive the film supply and take-up reels of the machine and comprising a section fixed to the supporting frame and a movable section in hinged association with said fixed magazine section, a shaft or spindle mounted centrally in said movable section to provide an individual journal bearing for the film supply reel, and a driven shaft or spindle journaled in the supporting frame in central association with said fixed magazine section and adapted to support and have rotative engagement with the film take-up reel, substantially as set forth.

5. In a film reeling mechanism for motion picture machines, the combination of a reel magazine having a transverse width adapted to receive the film supply and take-up reels of the machine and comprising a fixed cup shape section and a movable cup shape section, a shaft or spindle mounted centrally in said movable magazine section to provide an individual journal bearing for the film supply reel, and a driven shaft or spindle associated centrally with said fixed magazine section and adapted to support and have rotative engagement with the film take-up reel, substantially as set forth.

6. In a film reeling mechanism for motion picture machines, the combination of a reel magazine having a transverse width adapted to receive the film supply and take-up reels of the machine and comprising a fixed cup shape section and a movable cup shape section in hinged association with said fixed section, a shaft or spindle mounted centrally in said movable magazine section to provide an individual journal bearing for the film supply reel, and a driven shaft or spindle associated centrally with said fixed magazine section and adapted to support and have rotative engagement with the film take-up reel, substantially as set forth.

7. In a film reeling mechanism for motion picture machines the combination of a supporting frame, a reel magazine having a transverse width adapted to receive the film supply and take-up reels of the machine and comprising a cup shape section fixed to the supporting frame and movable cup shape section associated with said fixed section, a shaft or spindle mounted centrally in said movable section to provide an individual journal bearing for the film supply reel, and a driven shaft or spindle journaled in the supporting frame in central association with said fixed magazine section and adapted to support and have rotative engagement with the film take-up reels, substantially as set forth.

8. In a film reeling mechanism for motion picture machines, the combination of a supporting frame, a reel magazine having a transverse width adapted to receive the film supply and take-up reels of the machine and comprising a cup shape section fixed to the supporting frame and a movable cup shape section in hinged association with said fixed section, a shaft or spindle mounted centrally in said movable section to provide an individual journal bearing for the film supply reel, and a driven shaft or spindle journaled in the supporting frame in central association with said fixed magazine section and adapted to support and have rotative engagement with the film take-up, substantially as set forth.

Signed at Chicago, Illinois, this 31st day of October, 1917.

LOUIS B. LARSEN.
OSCAR J. HOLMES.
HANS G. LARSEN.